US00RE40452E

(19) United States
(12) Reissued Patent
Harumoto

(10) Patent Number: US RE40,452 E
(45) Date of Reissued Patent: Aug. 5, 2008

(54) IMAGE FORMING APPARATUS AND REPLACEMENT PART USED THEREFOR

(75) Inventor: Katsumi Harumoto, Saitama (JP)

(73) Assignee: Fuji Xerox Co., Ltd., Tokyo (JP)

(21) Appl. No.: 11/000,492
(22) Filed: Dec. 1, 2004

Related U.S. Patent Documents

Reissue of:
(64) Patent No.: 6,490,422
Issued: Dec. 3, 2002
Appl. No.: 09/930,978
Filed: Aug. 17, 2001

(30) Foreign Application Priority Data

Aug. 18, 2000 (JP) ..... 2000-248713

(51) Int. Cl.
*G03G 15/00* (2006.01)

(52) U.S. Cl. ..... 399/27; 399/12
(58) Field of Classification Search ..... 222/DIG. 1; 399/12, 13, 27, 90, 110, 119
See application file for complete search history.

(56) References Cited

U.S. PATENT DOCUMENTS 6,324,351 B1 11/2001 Kurimoto et al.

FOREIGN PATENT DOCUMENTS

JP 2000-187415 7/2000

*Primary Examiner*—Hoang Ngo
(74) *Attorney, Agent, or Firm*—Morgan, Lewis & Bockius LLP

(57) ABSTRACT

In an image forming apparatus including a periodic replacement part detachably mounted to the apparatus main body, the periodic replacement part is provided with a storage medium storing information on the replacement part. The information stored in the storage medium can at least be read on the main body side of the image forming apparatus using a communication portion communicating through a radio wave.

30 Claims, 13 Drawing Sheets

IMAGE FORMING APPARATUS AND REPLACEMENT PART USED THEREFOR

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to an image forming apparatus such as a printer and a copying machine including a periodic replacement part detachably mounted at the main body thereof and a replacement part used therefor in which a storage medium holding information on a replacement part is stored in the main body of the replacement part, and the information on the replacement part is used for controlling the main body of the apparatus.

2. Description of the Related Art

In recent years, in the image forming apparatus such as a printer and a copying machine as described above, there has been a general tendency to input information on a replacement part such as a toner cartridge to the main body of the apparatus and control the apparatus based on the input information in order to better the commercial value of the apparatus to improve the operability. For example, according to a practiced technique, in a network printer connected with a personal computer, information on the toner remaining amount of a toner cartridge, for example, is input to the printer main body. The input information is transmitted to a host computer, and the toner remaining amount is displayed at the monitor of a user interface for the host computer, so that the user can readily know the time to exchange the toner cartridge.

Also in the image forming apparatus such as a printer and a copying machine as described above, information on replacement parts such as a toner cartridge is input to the main body of the apparatus so that various replacement parts are identified from one another or kinds of toner in the toner cartridges are identified from one another.

As a method of inputting such information on a replacement part to the apparatus main body as described above and controlling the apparatus based on the input information, a replacement part such as a toner cartridge may be provided with a storage medium which can be used for information transmission to the main body of the apparatus.

A drawer connector is generally used as a conventional coupling device for transmitting information between the recording medium provided at a replacement part such as a toner cartridge as described above and the main body of the apparatus. This is because the drawer connector can be electrically connected in association with the mounting of the replacement part.

The conventional technique described above, however, suffers from the following disadvantages.

1) The drawer connector is connected in one direction and therefore the direction of connecting the replacement part is restricted. For example, a toner cartridge is typically inserted in the axial direction of the apparatus main body, then turned by a prescribed angle and set. However, it would not be possible to connect the drawer connector by such operation in view of the structure because the drawer connector is basically connected in one direction.

2) The drawer connector requires certain force for connection, which could impair the operability of the replacement part. The drawer connector should be operated with different kinds of force for different parts, and the user might prematurely judge that the mounting is complete when the replacement part is not completely mounted, in other words, a mounting fault could result.

3) If toner or the like sticks to the connecting portion of the drawer connector, a connection fault could be caused.

4) When there are multiple replacement parts in an image forming apparatus, a drawer connector for each part is necessary, which increases the size and cost of the device.

5) The recording medium provided at a replacement part to be connected using a drawer connector cannot be reduced in size as the result of using the drawer connector. The drawer connector used should have about six to ten pins, in other words the drawer connector is large in size, which increases the size and cost of replacement parts.

6) If a replacement part such as a toner cartridge is attached to a rotating body in a rotary developing device, the rotating part and the stationary part must be electrically connected, and therefore the reliability at the contact of the rotary part and the stationary part is low.

SUMMARY OF THE INVENTION

The present invention is therefore directed to a solution to the disadvantages associated with the conventional technique described above, and provides an image forming apparatus provided with information on a replacement part as an input to a main body thereof, and controlled based on the information, and a replacement part used therefor, in which the direction of connecting the replacement part is not restricted, the operability of the replacement part is not lowered, the size and cost of the apparatus or the replacement part are not increased and yet the information on the replacement part can surely be input to the apparatus main body.

More specifically, according to an aspect of the present invention, in an image forming apparatus having a periodic replacement part detachably mounted to a main body thereof, the replacement part includes a storage medium storing information on the replacement part. The information stored in the storage medium can at least be read on the main body side of the image forming apparatus by the communication portion communicating through a radio wave. In this structure, the storage medium provided at the replacement part and the apparatus main body side communicate by the communication portion communicating through a radio wave, so that the method of mounting the replacement part can be set as desired and the operability can be improved. Since a drawer connector for transmitting information is not necessary for the storage medium of the replacement part, the size of the storage medium can be reduced, so that the replacement part itself can be reduced in size.

Note that the replacement part is, for example, a toner cartridge, but the invention is not limited to this and is applicable to any replacement part used in an image forming apparatus such as a photoreceptor drum, a fuser, a transfer roll, an intermediate transfer body (such as a drum and a belt), and a waste toner box. The term "periodic" in "the periodic replacement part" means that the replacement is expected for the part, and the part actually does not have to be periodically replaced.

The information stored in the storage medium of the replacement part such as a toner cartridge storing toner is the used amount of the toner, the number of prints, information on the manufacture (such as the date of manufacture), user information, monitored information on the use environment such as temperature and humidity, and the number of reuse. Note, however, that the information stored in the storage medium of the replacement part is not limited to these kinds, and may include various kinds of information on the replacement part or the image forming apparatus using the replacement part.

Furthermore, an image forming apparatus having a periodic replacement part detachably mounted to a main body of the apparatus has multiple replacement parts, and a single communication portion is used as a communication portion on the main body side of the apparatus to storage media of the multiple replacement parts. In this structure, only the one communication portion on the apparatus main body side is necessary to the storage media of the multiple replacement parts, and therefore the size and cost of the apparatus can be reduced.

According to another aspect of the present invention, a periodic replacement part detachably mounted to an image forming apparatus is provided with a storage medium storing information on the replacement part. The information stored in the storage medium can at least be read on the main body side of the image forming apparatus by a communication portion communicating through a radio wave. In this structure, the storage medium provided at the replacement part and the image forming apparatus communicate by the communication portion communicating through a radio wave, and therefore the method of mounting the replacement part can be set as desired, so that the operability is improved. A drawer connector for information transmission is not necessary for the storage medium in the replacement part, and therefore the size of the storage medium can be reduced, so that the replacement part itself may be reduced in size.

BRIEF DESCRIPTION OF THE DRAWINGS

Preferred embodiments of the present invention will be described in detail based on the following figures, wherein.

DETAILED DESCRIPTION OF THE PREFERRED EMBODIMENTS

Embodiments of the present invention will be now described in conjunction with the accompanying drawings.

First Embodiment

Figure 2:
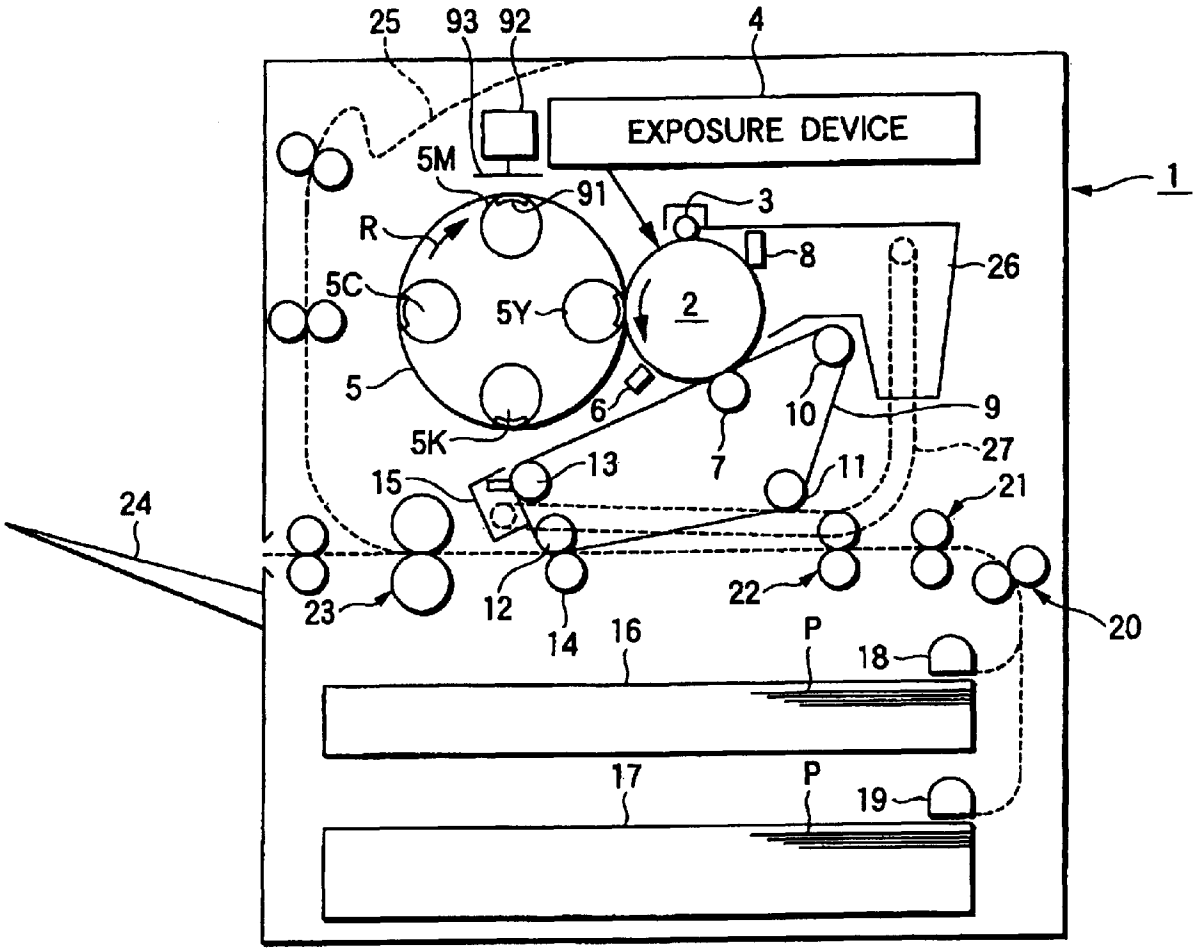
FIG. 2 is a view of a color printer as the image forming apparatus according to the first embodiment of the invention.

FIG. 2 is a view of a full-color printer as an image forming apparatus according to a first embodiment of the present invention.

In FIG. 2, reference numeral 1 represents the main body of the full-color printer, and a photoreceptor drum 2 as an image holding part is provided in the apparatus main body 1. The photoreceptor drum 2 is driven to rotate at a prescribed speed in the direction denoted by the arrow by a driving portion which is not shown. When the surface of the photoreceptor drum 2 is uniformly charged to a prescribed potential by a charging roll 3, and then a full-color image is formed using an exposure device 4 formed of, for example, an ROS (Raster Output Scanner), images in four colors, i.e., yellow (Y), magenta (M), cyan (C) and black (K) are sequentially subjected to exposure, and electrostatic latent images corresponding to these colors are formed. An electrostatic latent image in a prescribed color formed on the surface of the photoreceptor drum 2 is developed by a corresponding one of developing units 5Y, 5M, 5C and 5K in a rotary developing device 5 and formed into a toner image in the color. The rotary developing device 5 includes the developing units 5Y, 5M, 5C and 5K for the four colors, i.e., yellow (Y), magenta (M), cyan (C) and black (K) in order to develop a full-color image. The developing units 5Y, 5M, SC and 5K each develop a latent image on the photoreceptor drum 2 with yellow, magenta, cyan and block toner, respectively. When each toner color image is developed, the rotary developing device 5 is rotated in the direction of the arrow R by a motor which is not shown, and the developing unit 5Y, 5M, 5C or 5K for the corresponding color is positioned at a developing position opposing the photoreceptor drum 2. Note that a test chart is formed on the photoreceptor drum 2 in a process control mode, and the density of the test chart is detected using a density sensor 6. Each toner color image developed on the photoreceptor drum 2 is sequentially transferred by a primary transfer roll 7 onto an intermediate transfer belt 9 serving as an intermediate transfer body and the four color images are placed upon one another. The intermediate transfer belt 9 is movably laid across a driving roll 10, an idle roll 11, a back up roll 12, and an idle roll 13 in a tensioned condition. The driving roll 10 is driven by a driving motor surely moving at a constant speed which is not shown, and drives the intermediate transfer belt 9 to revolve at a prescribed speed.

The four color toner images transferred on the intermediate transfer belt 9 on one another are transferred altogether on a recording paper sheet P as a recording medium by a secondary roll 14 in pressure contact with the back up roll 12 through the intermediate transfer belt 9. The recording paper sheet P is fed by a paper feeding roll 18 or 19 from one of two paper feeding cassettes 16 and 17 provided at a lower portion in the apparatus main body, transported to a resist roll pair 22 through multiple transport roll pairs 20, 21 and then stopped. Then, the recording paper sheet P is transported to a secondary transfer position by the resist roll pair 22 which starts to rotate in synchronization with the toner image transferred on the intermediate transfer belt 9. At the secondary transfer position, the back up roll 12 and the secondary transfer roll 14 are in contact with each other under pressure through the intermediate transfer belt 9. The four color toner images are transferred altogether from the intermediate transfer belt 9 onto the recording paper sheet P at the secondary transfer position, and then the recording paper sheet P is subjected to fixing process by heat and pressure using a fixing unit 23, and switched by a switching gate which is not shown and discharged to a discharge tray 24 at the side surface of the apparatus main body or to an exhaust tray 25 at the upper part of the apparatus main body.

Note that the photoreceptor drum 2 after the toner image transfer process is removed of residual toner by a cleaning device 8 including a blade or the like to be ready for the next image forming process. The intermediate transfer belt 9 after the toner image transfer process is removed of residual toner by a belt cleaner 15 opposing the idle roll 13 to be ready for the next image forming process.

Figure 6:
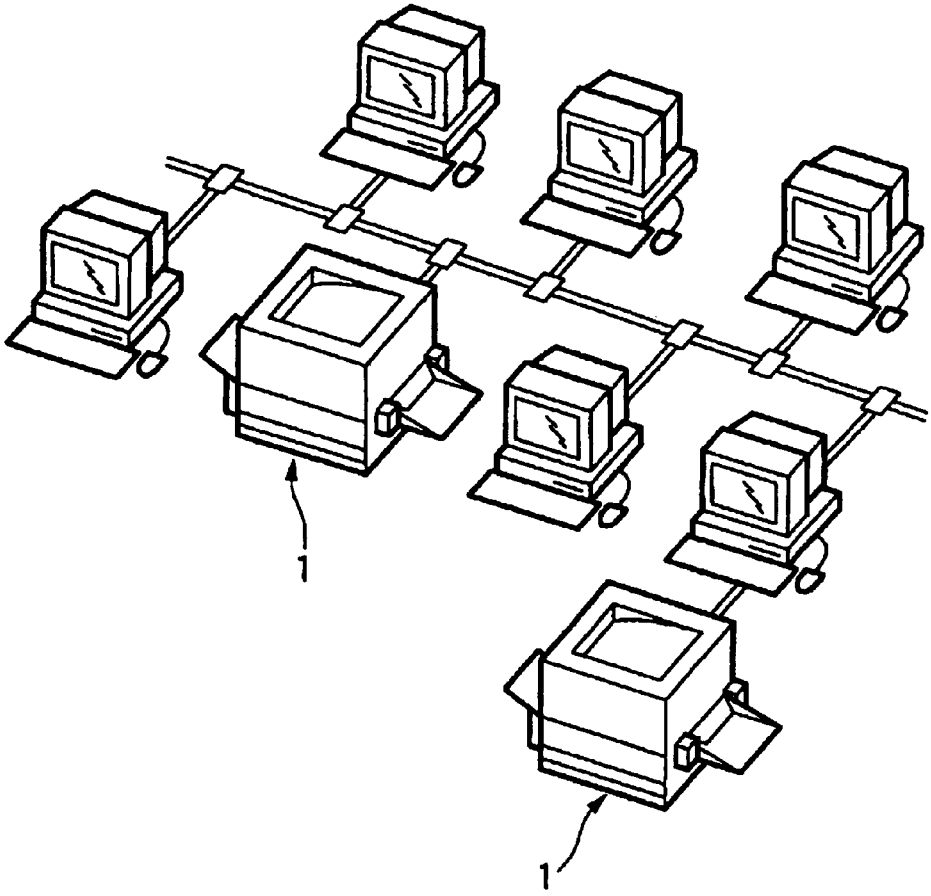
FIG. 6 is a view for use in illustration of how the color printer as the image forming apparatus according to the first embodiment of the present invention is used.

In use, as shown in FIG. 6, the full-color printer as described above is connected with multiple personal computers through a LAN or the like, and may be accessed by the multiple personal computers for printing. The state of the full-color printer may be detected by each personal computer.

The waste toner scraped by the cleaning device 8 and the belt cleaner 15 from the photoreceptor drum 2 or the intermediate transfer belt 9 is recovered to a waste toner recovery container 26. The waste toner collected from the belt cleaner 15 in particular is transported to the waste toner recovery container 26 through a transport tube 27 by the transport portion including an auger and a transport screw.

Figure 3:
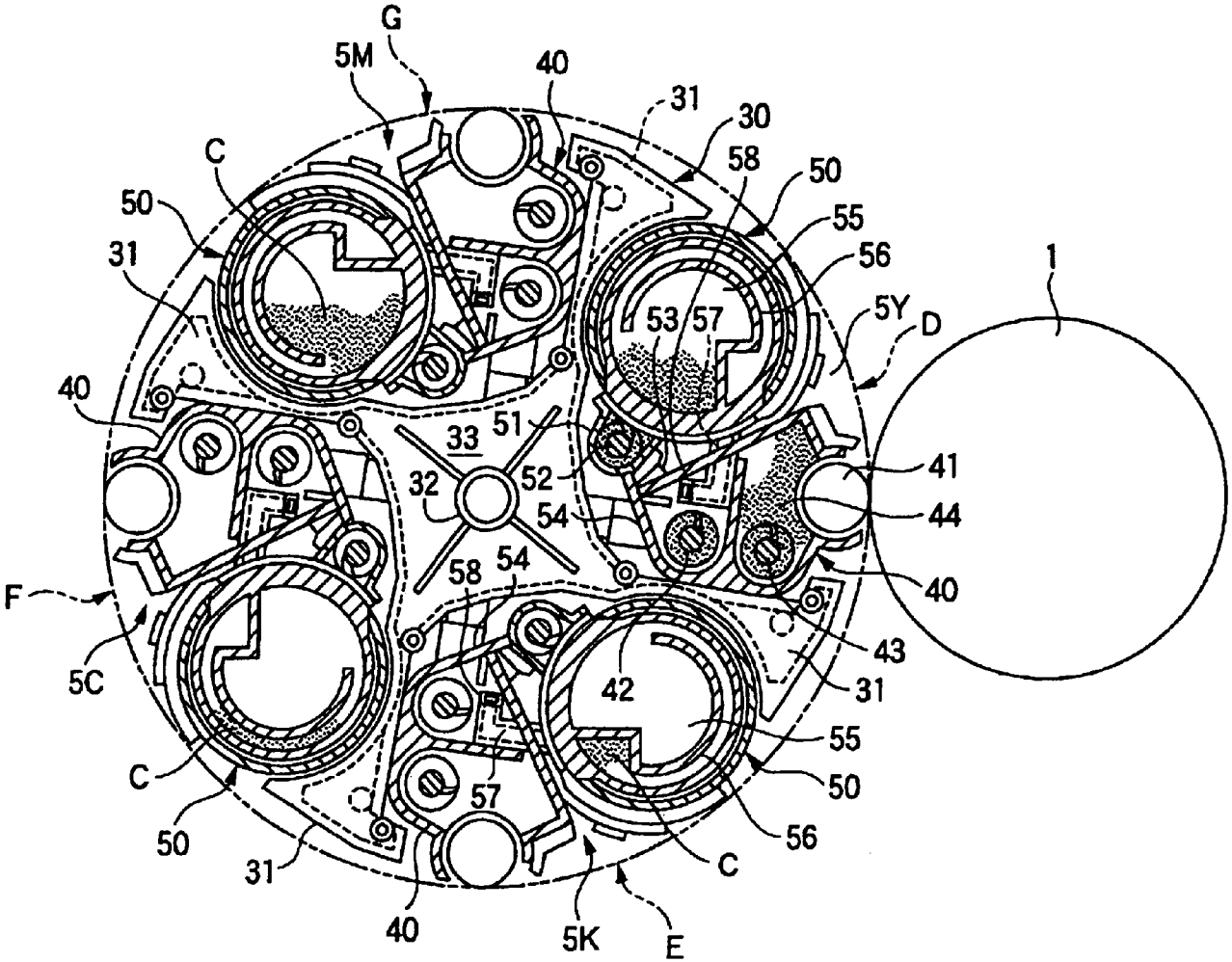
FIG. 3 is a view of a rotary developing device in the color printer as the image forming apparatus according to the first embodiment of the present invention.

FIG. 3 is a sectional view showing one example of such rotary developing device 5.

As shown in FIG. 3, the rotary developing device 5 includes a rotating body 30 rotatable in the clockwise direction around a rotation axis 32 positioned in the center. The rotating body 30 includes a central portion 33 formed in an approximately regular square shape, and four arms 31 extending about in the radial direction from the central portion 33 and forming an angle of 90° between each other. The arms 31 of the rotating body 30 are provided with four developing units 5Y, 5M, 5C and 5K for yellow (Y), magenta (M), cyan (C) and black (K), respectively using a mounting device which is not shown.

These developing units 5Y, 5M, 5C and 5K all have the same structure, and therefore the developing unit 5 Y for yellow (Y) will be described here by way of illustration. The developing unit 5Y for yellow (Y) may be roughly divided into a developing unit main body 40 and a developer cartridge 50.

In the developing unit main body 40, there are a developing roll 41 elongated in the direction perpendicular to the surface of the sheet and two spiral augers 42, 43 located at the rear surface side of the developing roll 41 and extending parallel to the developing roll 41. Here, when the developing roll 41 rotates, the spiral auger 42 transports the developer 44 stored in the developing unit main body 40 in a direction perpendicular to the surface of the sheet while stirring the developer 44. Meanwhile, the spiral auger 43 transports the developer 44 in the direction opposite to the transport direction by the spiral auger 42 while stirring the developer 44, such that the developer 44 is evenly supplied to the developing roll 41.

The developing roll 41 adsorbs carriers included in the developer 44 by the magnetic force of a magnet roll (not shown) provided therein, and forms a magnetic brush of the developer 44 on the surface of the developing roll 41, so that the toner adsorbed by the carriers is transported to a developing region opposing the photoreceptor drum 2. An electrostatic latent image formed on the photoreceptor drum 2 is made visible by the magnetic brush of the developer 44 including the carriers and the toner formed on the surface of the developing roll 41.

The developing cartridge 50 includes a cylindrical container elongated in the direction perpendicular to the surface of the sheet, and the inside of the developer cartridge 50 is divided into a storage chamber for new developer and a recovery chamber for degraded developer.

The storage chamber for new developer is provided with a supply opening (not shown) which is in communication with an approximately cylindrical casing 51 for guiding new developer into the developing unit main body 40. The cylindrical casing 51 is provided on the upper part of the developing unit main body 40 on the rear surface side. A spiral auger 52 is provided in the casing 51, and the developer 44 supplied from the developer cartridge 50 is guided by the spiral auger 52 to the supply opening 53 provided on the upper part of the developing unit main body 40 on the rear surface side, and supplied into the developing unit main body 40. An outlet positioned at the lower end of the supply opening 53 of the developing unit main body 40 is provided with a flap 54 which can be opened/closed as required. The flap is open when the developing unit 57 is in the developing position D in FIG. 3. Meanwhile, the flap 54 is closed by its own weight when the developing unit 5Y is in the position F or G in FIG. 3.

The degraded developer recovery chamber 55 in the developer cartridge 50 is provided with a circulating recovery passage 56 which is connected with an exhaust tube 57 bent in an approximately L shape. The exhaust tube 57 is provided about in the center on the upper part of the developing unit main body 40, and a recovery opening 58 positioned at the tip end of the exhaust tube 57 (at the lower end in FIG. 3) is positioned in the developing unit main body 40. The recovery opening 58 is positioned more on the fore side than the new developer supply opening 53 and provided as an opening at a part of the ceiling of the developing unit main body 40. The new developer 44 supplied from the supply opening 53 is stirred/transported by the spiral augers 42, 43 for supply to the developing roll 41 while circulating within the developing unit main body 40, thereby contributing to the developing process. The old developer 44 which has contributed to the developing process while circulating within the developing unit main body 40 is recovered into the degraded developer recovery chamber 55 in the developer cartridge 50 through the recovery passage 56 from the recovery opening 58 when the developing unit main body 40 is in the position E or F in FIG. 3.

The rotary developing device 5 having this developing unit 5Y and the developing units 5M, 5C and 5K having the same structure allows the flap 54 to open the supply opening 53 by its own weight in the position D, i.e., the developing position where the developing unit main body 40 opposes the photoreceptor drum 2, and drives the spiral auger 52 to rotate, so that the new developer 44 is supplied into the developing unit main body 40 as required. When an electrostatic latent image on the photoreceptor drum 2 is developed by the developing unit main body 40, then the rotating body 30 rotates in the clockwise direction, and the developing unit comes to the lower right position E from the position D, the flap 54 is half-opened, and the recovery opening 58 is directed upwardly as shown in the figure. As a result, the old developer transported by the exhaust tube 57 is allowed to flow toward the recovery passage 56 rather than returning to the developing unit main body 40. The degraded developer C is recovered into the degraded developer recovery chamber 55 through the recovery passage 56 during the period in which the developing unit main body 40 travels from the lower left position F to the upper left position G. Thus, this circulating recovery passage 56 can prevent the recovered developer C from returning into the developing unit main body 40.

Meanwhile, as the developing unit main body 40 travels from the upper left position G to the upper right position D, i.e., the developing position by the function of an agitator (not shown) provided in the developer cartridge 50, the new developer 44 is sent to the casing 51 and then guided to the supply opening 53 by the spiral auger 52 in the casing 51. At this time, the flap 54 is open again to leave the supply opening 53 open, so that the new developer 44 is supplied into the developing unit main body 40 through the supply opening 53.

Figure 4:
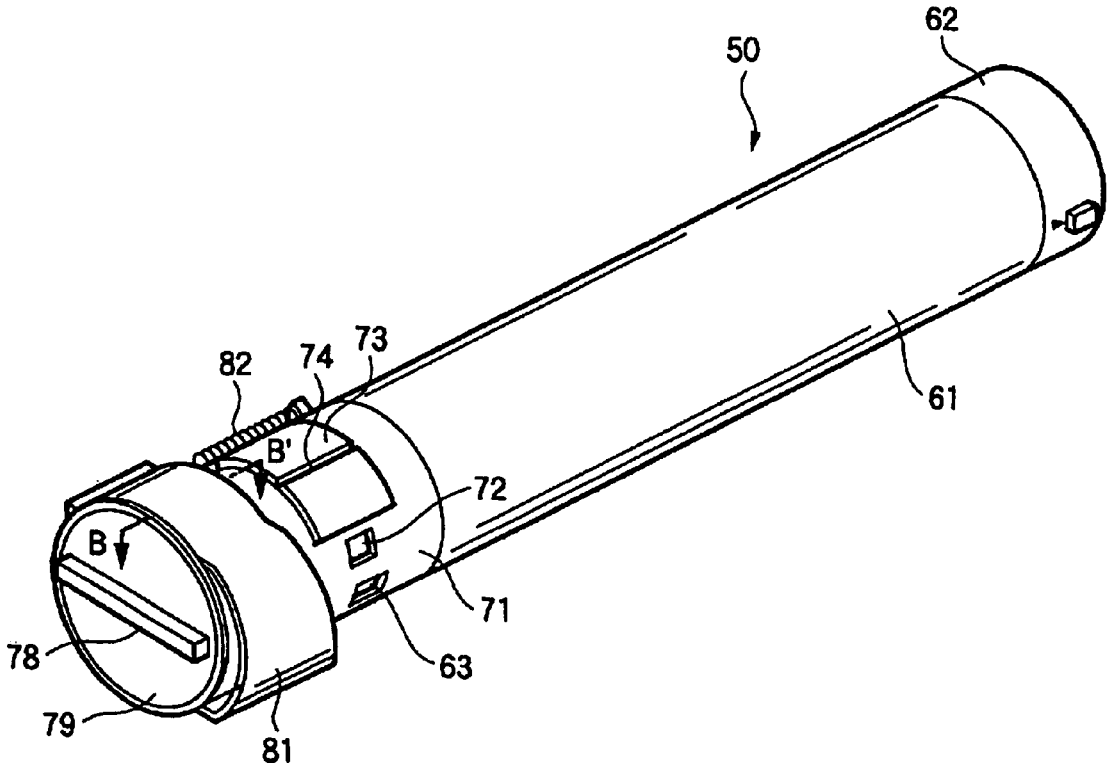
FIG. 4 is a perspective view of a developer cartridge.
Figure 5:
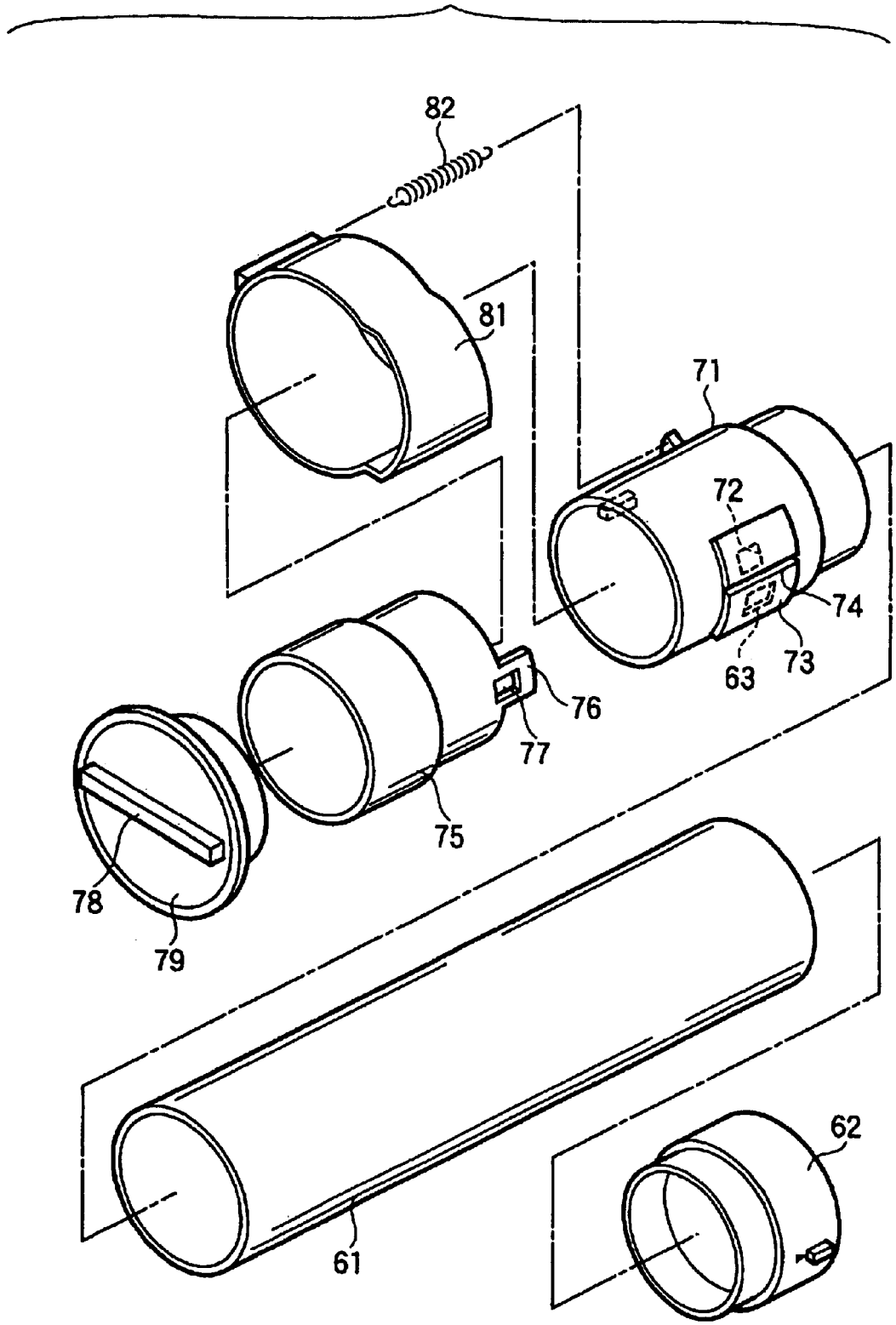
FIG. 5 is an exploded perspective view of the developer cartridge.

The structure of the developer cartridge 50 will be now described in conjunction with the perspective view in FIG. 4 and the exploded perspective view in FIG. 5.

As shown in FIGS. 4 and 5, the developer cartridge 50 includes a storage case 61 as a cylindrical, elongated developer storing portion (tubular body) to store new developer, a cap 62 as a detachable cap member to seal one end of the storage case, a supply opening 63 serving as an inlet for a passage to supply new developer from the storage case 61 to the developing unit main body 40 in the developing device, an intake 72 to take in degraded developer recovered from the developing unit, a short cylindrical recovery case 71 to store the degraded developer recovered through the intake 72, and a recovery box 75 serving as a developer recovery box fitted into the recovery case 71. The recovery box 75 has a projecting piece 76 as shown in FIG. 5, and an opening 77 provided through the projecting piece 76 is in communication with the intake 72 when the recovery box is fitted into the recovery case 71. A cap 79 having a handle 78 is pressed into the recovery box 75.

A recessed part defining a guide groove is formed around the supply opening 63 and the intake 72 in the circumferential direction. The guide groove is attached with a shutter 73 curved in a circular form along the outer surface of the developer cartridge 50 and provided slidably in the circumferential direction. A tubular slide cover 81 is slidably mounted around part of the recovery box 75 and the recovery case 71. The slide cover 81 is urged in the direction to cover the shutter 73 with a spring 82 as shown in FIG. 5.

Therefore, when the developer cartridge 50 is not mounted in a developer cartridge mounting portion in the rotating body 30, the shutter 73 blocks the supply opening 63 and the intake 72 by the elastic force applied by an element which is not shown, and the slide cover 81 is placed thereon.

Meanwhile, when the developer cartridge 50 is inserted to the developer cartridge mounting portion in the rotating body 30, an elongated groove 74 provided in the width-wise direction of the shutter 73 engages with a projection formed in the developer cartridge mounting portion. Then, turning the handle 78 with fingers rotates the developer cartridge 50 to move the shutter 73, so that the supply opening 63 and the intake 72 are both opened. The inclined open end of the slide cover 81 abuts against a stopper (not shown) on the apparatus side and the shutter 73 is exposed as a result. FIG. 4 shows how the developer cartridge 50 is mounted to the developer cartridge mounting portion, and as can be seen, the supply opening 63 and the intake 72 are both open.

In an image forming apparatus having detachable, periodic replacement parts mounted to the apparatus main body according to this embodiment, the replacement parts are each provided with a storage medium storing information on the replacement part. The information stored in the storage medium can at least be read on the main body side of the image forming apparatus by a communication portion communicating through a radio wave.

Also according to the embodiment, the image forming apparatus has multiple replacement parts, and a single communication portion on the main body side of the image forming apparatus can be used for communication with the storage media of these multiple replacement parts.

Furthermore, according to the embodiment, the communication portion for exchanging information between the storage media and the apparatus main body uses radio waves of a prescribed wavelength.

Figure 1:
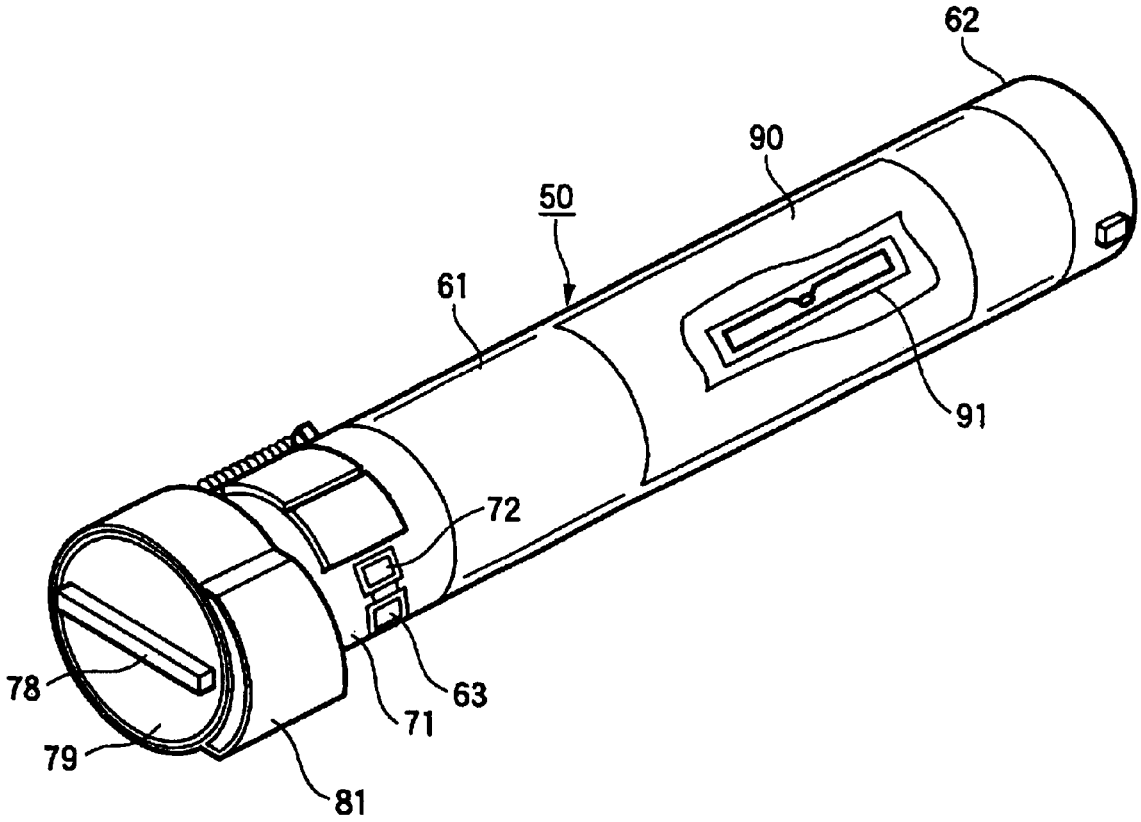
FIG. 1 is a perspective view of a replacement part in an image forming apparatus according to a first embodiment of the invention.

More specifically, according to the embodiment, as shown in FIG. 1, the developer cartridge 50 as a replacement part is attached with a label 90 at the outer circumferential surface of the elongated, cylindrical storage case 61 indicating the color of the toner in the developer cartridge 50 or how to mount the cartridge. At the surface under the label 90, a storage element member 91 called "non-contact CRUM" as a storage medium storing information or the like on the developer cartridge 50 is integrally attached. As shown in FIG. 2, in the main body 1 of the full-color printer described above, at the developing unit (developing unit 5M as shown for example) positioned upstream of the developing position of the rotary developing device 5, a communication portion 92 on the apparatus main body used for radio wave communication with the storage element member 91 in the developer cartridge 50 is provided at a position corresponding to the upper part of the developer cartridge 50 of the developing device 5. The communication portion 92 on the apparatus main body side includes an antenna 93 for transmitting/receiving radio waves.

Figure 7:
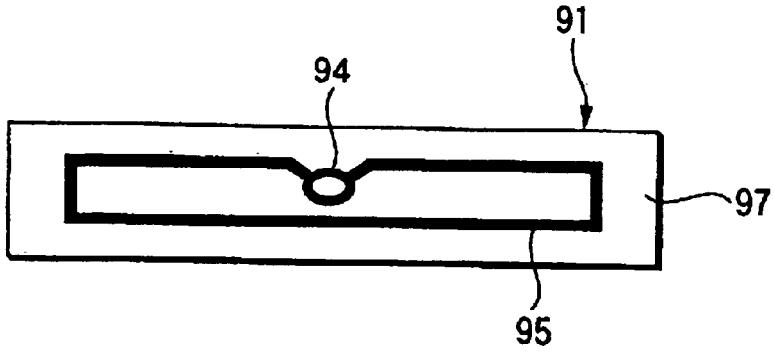
FIG. 7 is a plan view of a storage element member mounted to a developer cartridge.

Meanwhile, as shown in FIGS. 1 and 7, the storage element member 91 provided at the developer cartridge 50 is provided with a very small, rectangular storage element 94 positioned in the central part. Antennas 95 for transmission/reception are provided parallel to each other at a small distance on the right and left sides of the storage element 94. As shown in FIG. 7, the storage element member 91 is formed in the following process. A transparent synthetic resin film 97 is patterned to form an antenna 95 for transmission/reception thereon, which is then connected with the storage element 94, followed by coating with another transparent synthetic resin film 97.

The communication portion 92 on the apparatus main body side and the storage element member 91 on the side of the developer cartridge 50 can communicate with each other through radio waves at a prescribed frequency. The communication portion 92 can at least read information related to the developer cartridge 50 or the like stored in the storage element 94 in the storage element member 91 on the side of the developer cartridge 50 through radio wave at a prescribed frequency and can read and also can both read and write such information as required. The communication portion 92 transmits/receives radio waves at a prescribed frequency to/from the antenna 93, and transmits information to the storage element member 91 on the side of the developer cartridge 50 in a non-contacted state.

Figure 15:
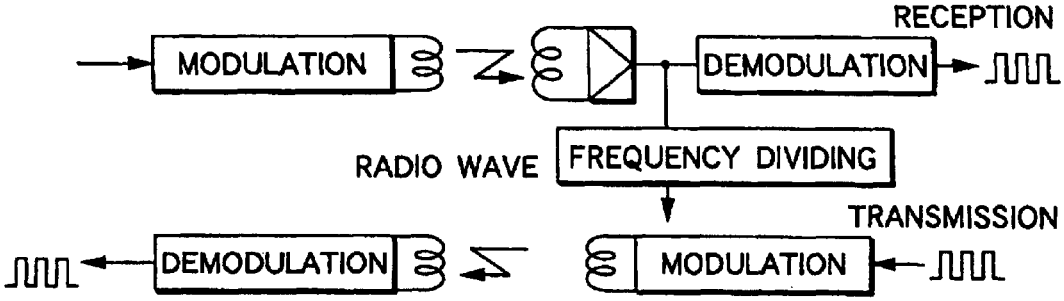
FIG. 15 is a circuit diagram of the configuration of a communication portion according to an embodiment of the present invention.

The communication portion 92 on the apparatus main body side and the storage element member 91 on the side of the developer cartridge 50 communicate as follows. As shown in FIG. 15, the communication portion 92 on the apparatus main body side transmits a radio wave in a modulated state to read out information stored in the storage element in the storage element member 91 from the antenna 93, while the radio wave is received by the antenna 95 in the storage element member 91 on the side of the developer cartridge 50 for demodulation. Meanwhile, the information frequency-divided and stored in the storage element is modulated and transmitted from the antenna 95 in a modulated state.

Figure 16:
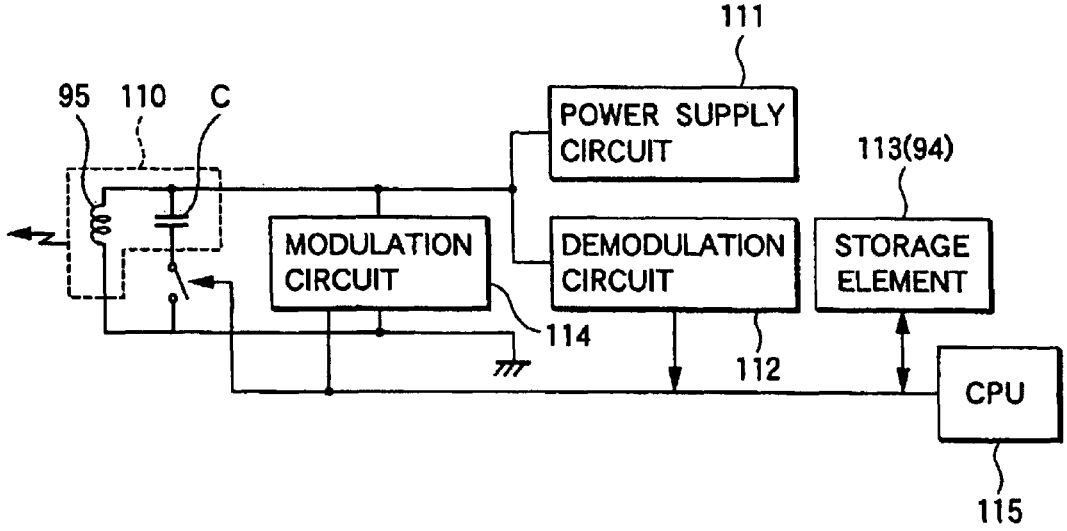
FIG. 16 is a block diagram of the circuit configuration of a storage element member in a developer cartridge.

More specifically, as shown in FIG. 16, the storage element member 91 on the side of the developer cartridge 50 includes an antenna coil serving as the antenna 95, an LC resonance circuit 110 which generates induced voltage by electromagnetic induction, a power supply circuit 111 which generates operation power based on a radio wave transmitted from the antenna 93 of the communication portion 92 and received by the LC resonance circuit, a demodulation circuit 112 which demodulates information transmitted from the communication portion 92 on the apparatus main body side, a storage element 113 which stores prescribed information, a modulation circuit 114 which modulates information to be transmitted to the communication portion 92 on the apparatus main body side, and a CPU 115 which controls these elements.

Figure 17:
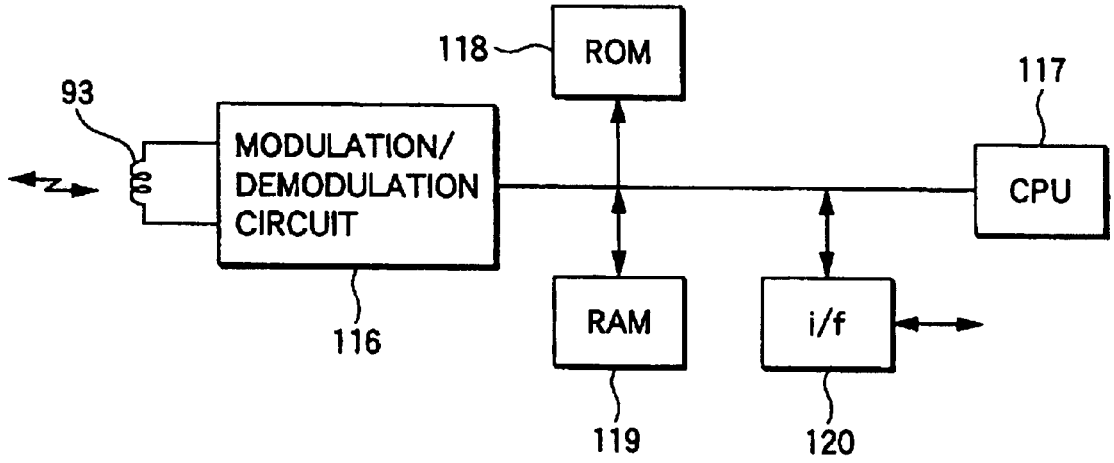
FIG. 17 is a block diagram of the circuit configuration of the communication portion of the main body of the apparatus.

As shown in FIG. 17, the communication portion 92 described above includes the antenna 93, a modulation/demodulation circuit 116 which modulates/demodulates a signal used to read information stored in the storage element member 91 on the side of developer cartridge 50 or write information as required, a CPU 117 which performs control for reading information stored in the storage element member 91 on the side of the developer cartridge 50 or write information as required, a ROM 118, and a RAM 119 or an interface 120.

The radio wave at a prescribed frequency used for communication by the communication portion 92 on the apparatus main body side may be, for example, at a frequency of 13.56 MHz. The communicable range of the communication portion 92 varies depending upon the intensity of the radio wave used. It is about in the range from 2 to 4 cm for an extremely weak radio wave, while it is about 25 cm for a low power wave. If an extremely weak radio wave is used so that the communicable range of the communication portion 92 may be about in the range from 2 to 4 cm, as shown in FIG. 2, the developing unit 5 communicating with the communication portion 92 moves (rotates) to a position close (about at a distance of 2 to 4 cm) to the communication portion 92 for communicating information. If a low power wave is used so that the communicable range of the communication portion 92 may be about 25 cm, as shown in FIG. 2, communication with the communication portion 92 is enabled regardless of the position of the developing units 5Y, 5M, 5C and 5K in the rotary developing device 5. In this case, the developing units 5Y, 5M, 5C and 5K in the rotary developing device 5 are distinguished from one another by the ID codes or the like of the storage element media 91 attached to the developer cartridges 50 of the developing units. Note that the radio wave at a prescribed frequency used for communication at the communication position 92 may be, for example, about at a frequency of 125 kHz.

Figure 8:
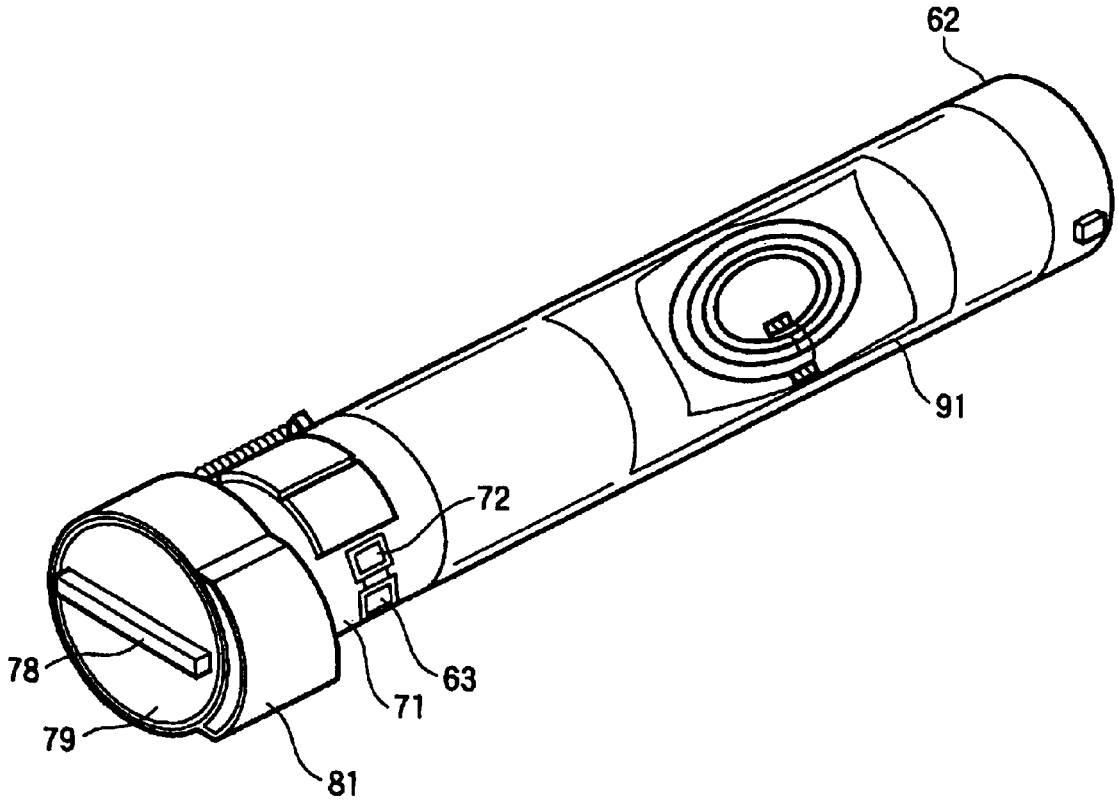
FIG. 8 is a perspective view of a modification of a replacement part in the image forming apparatus according to the first embodiment of the present invention.
Figure 9:
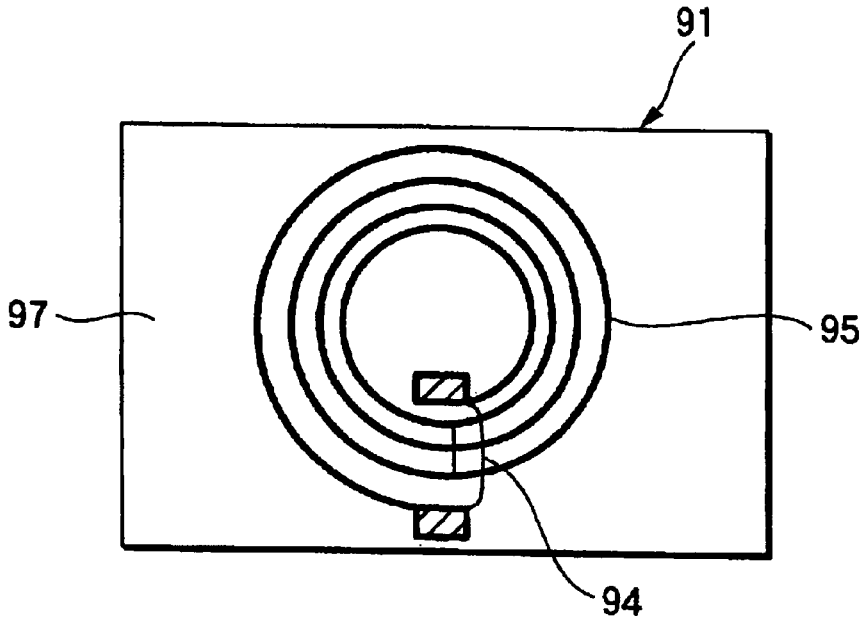
FIG. 9 is a plan view of another example of the storage element member mounted to the developer cartridge.

Note that as the storage element member 91 on the side of the developer cartridge 50, those as shown in FIGS. 8 and 9 may be used.

Meanwhile, the storage element member 91 on the side of the developer cartridge 50 does not have a power supply for its own. The element 91 obtains power for reading information stored in the storage element 94 or for transmitting the stored information to the communication portion 92 on the main body side by the function of electromagnetic induction when the radio wave transmitted from the communication portion 92 is, received by the receiving antenna 95.

Furthermore, according to the embodiment, information transmitted from the main body side of the image forming apparatus by communication can be written in an unused memory region of the storage medium of each replacement part.

In addition, according to the embodiment, the memory region of the storage medium of the replacement part includes, for example, rewritable and un-rewritable regions.

Also according to the embodiment, information stored in the storage medium of the replacement part is used for controlling the operation of the apparatus main body, and the control to change the operation of the apparatus main body is performed based the kind of the replacement part.

Furthermore, according to the embodiment, the image forming apparatus has multiple replacement parts and a moving device to move these multiple replacement parts. The multiple replacement parts are each moved to a position where the storage medium of the replacement part can communicate with the communication portion of the apparatus main body side.

Figure 10:
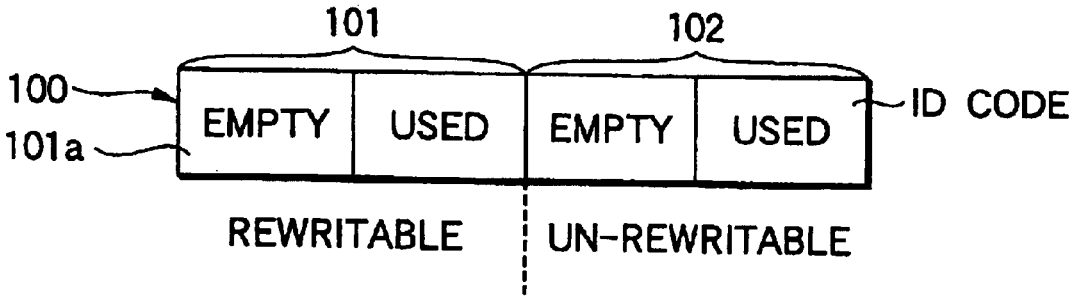
FIG. 10 is a diagram of a storage region in the storage element member.
Figure 11:
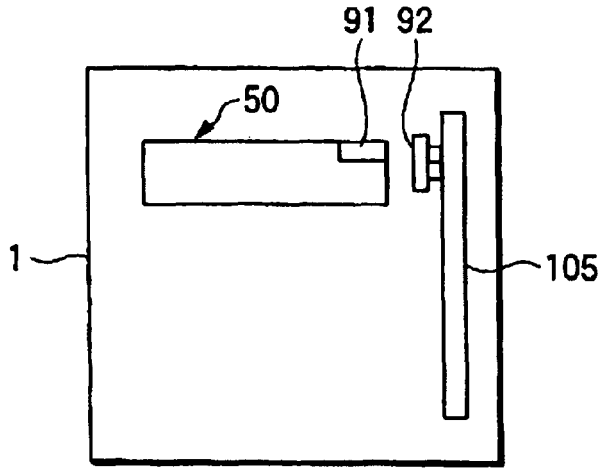
FIG. 11 is a diagram of a circuit board in the color printer as the image forming apparatus according to the first embodiment of the present invention.

More specifically, according to the embodiment, as shown in FIG. 10, the memory region 100 of the storage element 94 includes a rewritable region 101 and an un-rewritable region 102, and information transmitted from the apparatus main body side can be written to an unused memory region 101a in the rewritable region 101 in the storage element 94. Information related to the used amount of the developer, for example, is written in the (21) unused memory region 101a in the rewritable region 101 in the storage element 94. Information such as an ID code indicating the kind or color of toner, for example, is written in the un-rewritable region 102 in the memory region 100 in the storage element 94.

Also according to this embodiment, as shown in FIG. 2, the developing device 5 having the developer cartridge 50 mounted therein is rotatably provided. Thus, the rotating movement of the developing device 5 allows the storage element member 91 in the developer cartridge 50 provided at each of the developing units in the developing device 5 to individually communicate with the communication portion 92 on the apparatus main body.

Furthermore, according to the embodiment, as shown in FIG. 9, the communication portion 92 on the apparatus main body is integrally provided at a circuit board 105 previously provided at the apparatus main body 1 on the back surface side.

Figure 12:
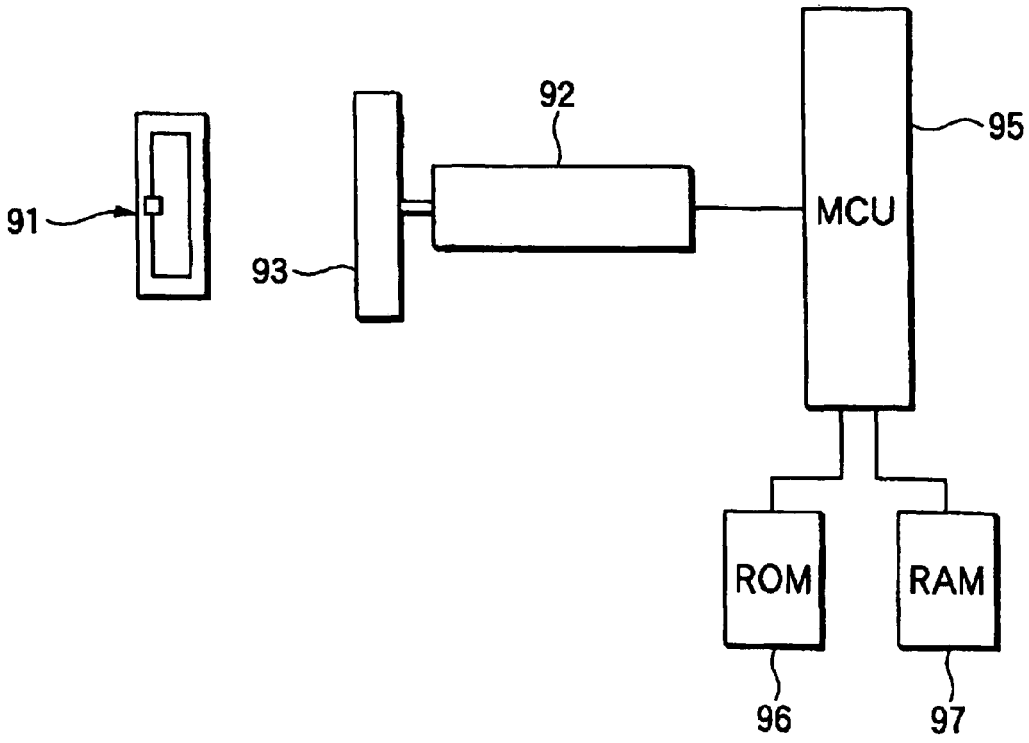
FIG. 12 is a diagram of the circuit board in the color printer as the image forming apparatus according to the first embodiment of the present invention.

FIG. 12 is a block diagram showing a control circuit in the color printer apparatus described above.

In FIG. 12, reference numeral 91 represents a storage element member provided at the developer cartridge 50, 92 is the communication portion on the apparatus main body side, 93 is the antenna of the communication portion 92, 94 is the antenna of the storage element member 91 in the developer cartridge 50, 95 is an MCU as a control portion which controls the image forming operation of the full-color printer, 96 is a ROM storing a program to enable the MCU 95 to perform control operation, and 97 is a RAM storing parameters used by the MCU 95 to perform control operation.

In the color printer as an image forming apparatus according to the embodiment having the above described structure, information on a replacement part is input to the apparatus main body in the following manner and the apparatus is controlled based on the information. In the apparatus, the direction of connecting the replacement part is not restricted, the operability of the replacement part is not lowered, the size and cost of the apparatus or the replacement part are not increased and yet the information on the replacement part can surely be input to the apparatus main body.

Figure 13:
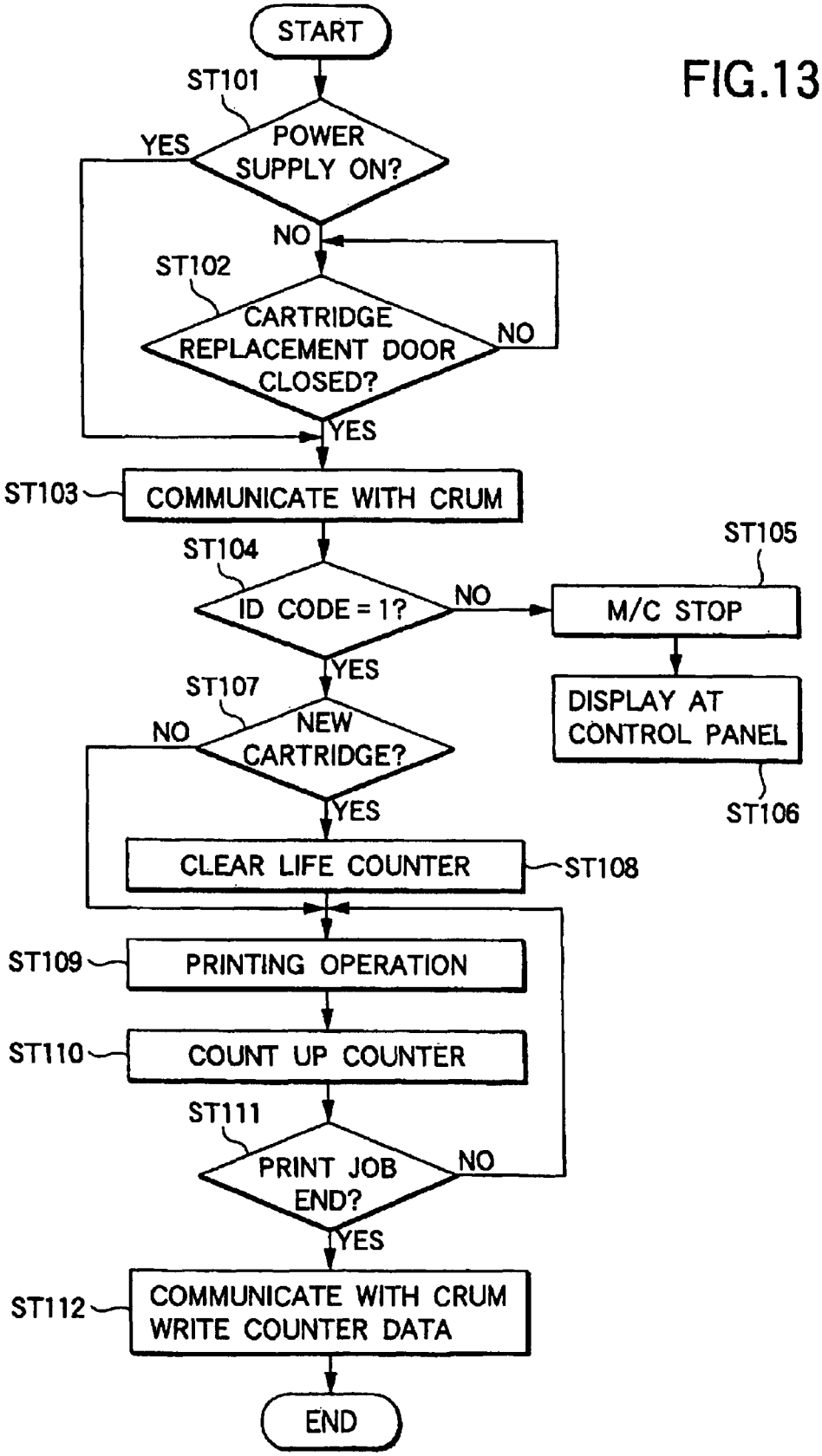
FIG. 13 is a flow chart for use in illustration of the operation of controlling the color printer as the image forming apparatus according to the first embodiment of the present invention.

More specifically, in the color printer according to the embodiment, the MCU 95 performs control as shown in FIG. 13. First, it is determined whether or not the power supply is on (step 101). If an interlock switch or the like to detect the open/closed state of the door of the apparatus main body 1 is off and it is determined that the power supply is not on, it is then determined whether or not a door for replacing the cartridge is closed (step 102). If the door for replacing the cartridge is not closed, the control stands by until the door for replacing the cartridge is closed (step 102). If it is determined that the power supply is on, the MCU proceeds to step 103.

Then, if it is determined that the power supply is on or that the door for replacing the cartridge is closed, the MCU communicates with the storage medium member 91 in the developer cartridge 50 called "CRUM" through the communication portion 92 on the apparatus main body side (step 103), reads out an ID code stored in the storage element 94 in the storage medium member 91 in the developer cartridge 50 to determine whether or not the ID code is "1" (step 104). Herein, the ID code of the developer cartridge 50 is represented by an individual key (number) set for each kind or color of toner.

Thereafter, if the ID code stored in the storage element 94 in the storage medium member 91 in the developer cartridge 50 is not a prescribed code, i.e., "1" here, the MCU immediately stops the apparatus (step 105), and the indication that a developer cartridge 50 other than the prescribed developer cartridge 50 is mounted is displayed on the display portion of the control panel or on the display of a personal computer connected through a LAN or the like (step 106).

Note that there may be provided a control portion which notifies the operator of the state if the communication portion 92 on the apparatus main body side detects a larger number of storage media than the number of replacement parts which can be mounted to the image forming apparatus.

If then the MCU determines that the ID code of the mounted developer cartridge 50 is "1", it is determined whether or not the developer cartridge 50 is a new cartridge based on information stored in the storage element 94 in the storage medium member 91 in the developer cartridge 50 (step 107). If it is determined that the developer cartridge 50 is a new cartridge, the life counter (software counter) of the developer cartridge 50 is cleared (step 108) and a printing operation is started (step 109). If it is determined that the developer cartridge 50 is not a new cartridge, the life counter (software counter) of the developer cartridge 50 is not cleared and a printing operation is started (step 109).

At the time, after the counter to count the used amount of the developer in association with the printing operation is incremented (step 110), it is determined whether or not the printing JOB is completed (step 111). If the printing JOB is not completed, the MCU returns to step 109 and continues the printing operation (step 109). If the printing JOB has been completed, the MCU communicates with the storage medium member 91 called "CRUM" in the developer cartridge 50 through the communication portion 92 on the apparatus main body side, and writes data in the counter to count the used amount of the developer in the storage element 94 in the storage medium member 91 in the developer cartridge 50 (step 112), and the operation ends.

As described above, according to the embodiment, the developer cartridge 50 is installed with the storage element 94 storing information on the developer cartridge 50, and the information stored in the storage element 94 can at least be read on the apparatus main body side by the communication portion 92 which communicates through a radio wave. In this structure, the storage element 94 provided in the developer cartridge 50 and the apparatus main body side can communicate with one another by the communication portion 92 through a radio wave. Therefore, the method of mounting the developer cartridge 50 as a replacement part can be set as desired, so that the operability may be improved. A drawer connector for information transmission is not necessary for the storage element 94 in the developer cartridge 50, and therefore the size of the storage element 94 can be significantly reduced, so that the replacement part itself may be reduced in size.

Also according to the embodiment described above, the multiple developer cartridges 50 are provided, and the single communication portion 92 is used as a communication portion on the main body side of the image forming apparatus to the storage elements 94 in the multiple developer cartridges 50. Thus, since only the one communication portion 92 on the apparatus main body side is necessary for the memory elements 94 in the multiple developer cartridges 50, the size and cost of the apparatus can be reduced.

Furthermore, according to the embodiment, the communication portion 92 communicating information between the storage elements 94 in the multiple developer cartridges 50 and the apparatus main body utilizes a radio wave having a prescribed wavelength. Thus, the storage element 94 in the developer cartridge 50 and the apparatus main body can communicate in a non-contact state.

In addition, according to the embodiment, information transmitted from the main body side of the image forming apparatus by communication with the apparatus main body side can be written into the unused memory region 101a in the storage element 94 in the developer cartridge 50. Thus, the use state of the developer cartridge 50 can be input to the storage element 94, and optimum control can be achieved if the developer cartridge 50 which has been once used is re-mounted to the apparatus.

Also according to the embodiment, the memory region in the storage element 94 in the developer cartridge 50 includes the rewritable region 101 and the un-rewritable region 102. In this structure, information storage in the un-rewritable region 102 provided in the memory region 100 in the storage element 94 may be used to identify information such as the date of manufacture, the number of reuse, and the area of use. Therefore, the main body of the image forming apparatus can be controlled in an optimum manner based on the characteristic of the replacement part, and the stored information on the characteristic of the replacement part can be prevented from being inadvertently erased or altered. As a result, inconvenience can be avoided in the apparatus main body.

Second Embodiment

Figure 14:
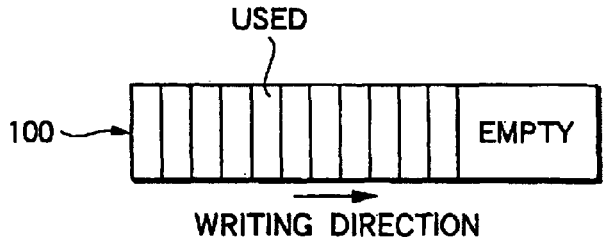
FIG. 14 is a diagram of a storage region in a storage element member in a color printer as an image forming apparatus according to a second embodiment of the present invention.

According to a second embodiment of the invention, as shown in FIG. 14, the memory region in the storage element 94 in the developer cartridge 50 is formed such that data can be only written to and read from there. In this structure, each time the developer in the developer cartridge 50 is consumed, the information is written to the memory region 100 in the storage element 94 in the developer cartridge 50, and it can be determined that the cartridge 50 has been used up if the memory region 100 is fully written. Therefore, the main body of the image forming apparatus can be controlled in an optimum manner based on the characteristic of the replacement part, and the stored information on the characteristic of the replacement part can be prevented from being inadvertently erased or altered. As a result, inconvenience can be avoided in the apparatus main body.

Also according to the second embodiment, the image forming apparatus has multiple replacement parts, and a moving device to move the communication portion on the apparatus main body side. The communication portion on the apparatus main body side can be moved to a position where the communication portion can communicate with the storage medium of a replacement part of interest by the moving device.

Figure 18:
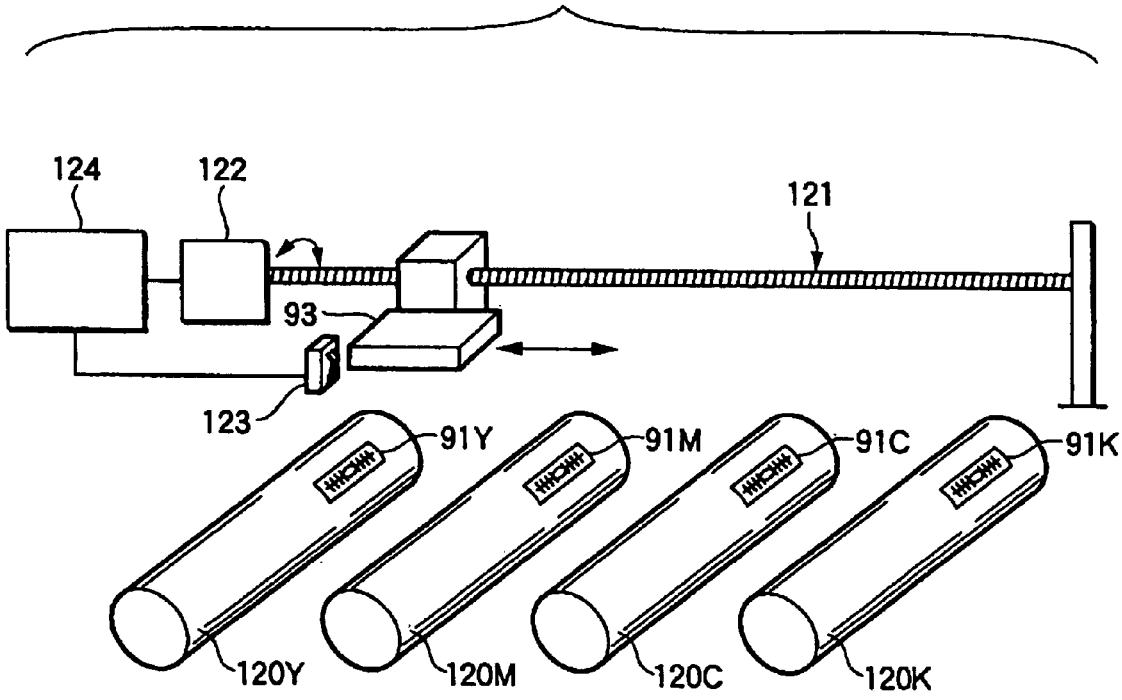
FIG. 18 is a view of a main part of the color printer as the image forming apparatus according to the second embodiment of the present invention.

More specifically, according to the second embodiment, as shown in FIG. 18, the image forming apparatus has four toner cartridges 120Y, 120M, 120C and 120K provided in a fixed state. These toner cartridges 120Y, 120M, 120C and 120K are attached with storage element members 91Y, 91M, 91C and 91K, respectively.

At the rear surface side of the four toner cartridges 120Y, 120M, 120C and 120K, a threaded shaft 121 is provided in the arrangement direction of these four cartridges. The threaded shaft 121 is driven to rotate by a driving portion 122 such as a stepping motor. The antenna 93 of the communication 122 as a stepping motor. The antenna 93 of the communication portion 92 on the apparatus main body side is mounted in a screwed manner to the threaded shaft 121, so that as the threaded shaft 121 is driven to rotate, the antenna 93 of the communication portion 92 on the main body side reciprocates.

Furthermore, a position detection sensor 123 to detect the position of the antenna 93 of the communication portion 92 on the apparatus main body side is provided at an end of the threaded shaft 121, and a signal from the position detection sensor 123 is input to the control circuit 124.

According to the embodiment, the driving portion 122 is reversed by the control circuit 124, and the antenna 93 of the communication portion 92 on the main body side is moved until the position detection sensor 123 turns on. When the position detection sensor 123 turns on, the driving portion 122 stops the driving operation.

The control circuit 124 drives (normally rotates) the driving portion 122 for a prescribed time period and moves the antenna 93 of the communication portion 92 on the main body side to a home position, where the antenna 93 is stopped.

Then, the control circuit 124 drives (normally rotates) the driving portion 122 for a prescribed time period and moves the antenna 93 of the communication portion 92 on the main body side to a communication position with the storage element member 91Y in the yellow toner cartridge 120Y for communication with the member.

Then, the control circuit 124 similarly drives (normally rotates) the driving portion 122 for a prescribed time period and moves the antenna 93 of the communication portion 92 on the main body side sequentially to communication positions with the storage element members 91M, 91C, and 91K in the magenta, cyan and black toner cartridges 120M, 120C and 120K for communication with the members.

The antenna 93 of the communication portion 92 on the apparatus main body side finally returns to the home position.

Furthermore, according to the second embodiment, the communicable range of the communication portion on the apparatus main body side is set within the outer size of the apparatus main body.

In addition, according to the second embodiment, when the communication portion on the apparatus main body side detects a larger number of storage media than the number of replacement parts which can be mounted to the image forming apparatus, the information from the storage media are not reflected on the control of the apparatus main body.

As in the foregoing, according to the present invention, the storage medium provided at a replacement part and the main body side of the image forming apparatus communicate by the communication portion communicating through a radio wave, and therefore the method of mounting the replacement part can be set as desired, so that the operability can be improved. A drawer connector for information transmission is not necessary for the storage medium of the replacement part, and therefore the size of the storage medium can be reduced. As a result, the replacement part itself can be reduced in size.

What is claimed is:

1. An image forming apparatus, comprising:

a plurality of periodic replacement parts each including a storage medium that stores information on the replacement part therein; and a main body of said image forming apparatus to which said periodic replacement part is detachably mounted, the main body including a single communication portion;

wherein said main body reads the information stored in said storage medium through said single communication portion using a radio wave, and wherein said image forming apparatus has the multiple replacement parts within a range to allow the single communication portion to transmit/receive the radio wave to/from them, and the storage media of at least two replacement parts are communicable with the single communication portion on the apparatus main body side.

2. The image forming apparatus according to claim 1, wherein said communication portion uses the radio wave having a predetermined wavelength.

3. The image forming apparatus according to claim 1, wherein said storage medium of said replacement part has an unused memory region to be writable with information transmitted from said main body side through said communication portion.

4. The image forming apparatus according to claim 1, wherein said storage medium of said replacement part includes a rewritable region and an un-rewritable region.

5. The image forming apparatus according to claim 1, wherein a memory region of said storage medium of said replacement part allows only writing and reading.

6. The image forming apparatus according to claim 1, wherein information originally stored in a memory region of said storage medium of said replacement part is neither rewritable nor erasable.

7. The image forming apparatus according to claim 1, wherein said storage medium of said replacement part holds internal information in a coded form according to a prescribed coding method.

8. The image forming apparatus according to claim 1, wherein the information stored in said storage medium of said replacement part is used to control the operation of said main body, and the operation of said main body is changed depending upon a kind of said replacement part.

9. The image forming apparatus according to claim 1, wherein said communication portion of said main body is integrally provided to a circuit board previously provided at said main body.

10. The image forming apparatus according to claim 1, further comprising a moving device that moves said communication portion of said main body to a position communicable with said storage medium of said replacement part.

11. The image forming apparatus according to claim 1, further comprising a moving device that moves said replacement parts to a position where said storage medium of said replacement part can communicate with said communication portion of said main body side.

12. The image forming apparatus according to claim 1, wherein said communication portion of said apparatus main body side has a communicable range which is set within the outer size of said main body.

13. The image forming apparatus according to claim 1, further comprising a control portion notifying an operator of the detection if said communication portion of said main body detects a larger number of the storage media than the number of replacement parts mountable to said image forming apparatus.

14. The image forming apparatus according to claim 1, wherein if said communication portion of said main body detects a larger number of the storage media than the number of replacement parts mountable to said image forming apparatus, information in said storage media is not reflected on the control of said main body.

15. The image forming apparatus according to claim 1, wherein said storage medium of said replacement part is provided to said replacement part integrally with a label attached to said replacement part.

16. A periodic replacement part configured to be detachably mounted to an image forming apparatus, said image forming apparatus including a plurality of the periodic replacement parts each including a storage medium that stores information on the replacement part therein; and a main body of said image forming apparatus to which said periodic replacement part is detachably mounted, the main body including a single communication portion, wherein said main body reads the information stored in said storage medium through said single communication portion using a radio wave, and wherein said image forming apparatus has the multiple replacement parts within a range to allow the communication portion to transmit/receive the radio wave to/from them, and the storage media of at least two replacement parts are communicable with the single communication portion on the apparatus main body side, said replacement part comprising:

the storage medium that stores information on said replacement part, and the information stored in said storage medium can be read on said main body by the communication portion communicating through the radio wave.

17. The replacement part according to claim 16, wherein said image forming apparatus further includes a moving device that movably mounts said replacement part to said image forming apparatus, and moves said replacement part to a position where the storage medium of said replacement part can communicate with said communication portion of said main body side.

18. The replacement part according to claim 16, wherein information stored in the storage medium of said replacement part is used for controlling the operation of said image forming apparatus, and the operation of said image forming apparatus is changed based on a kind of the replacement part.

19. An image forming apparatus, comprising:

a plurality of periodic replacement parts each including a storage medium that stores information on the replacement part therein;

a main body of said image forming apparatus to which said periodic replacement part is detachably mounted and including a single communication portion, wherein said main body reads the information stored in said storage medium through said single communication portion using a radio wave; and a control portion notifying an operator of the detection if said communication portion of said main body detects a larger number of the storage media than the number of replacement parts mountable to said image forming apparatus.

20. An image forming apparatus, comprising:

a plurality of periodic replacement parts each including a storage medium that stores information on the replacement part therein; and a main body of said image forming apparatus to which said periodic replacement part is detachably mounted and including a single communication portion, wherein said main body reads the information stored in said storage medium through said single communication portion using a radio wave, and wherein if said communication portion of said main body detects a larger number of the storage media than the number of replacement parts mountable to said image forming apparatus, information in said storage media is not reflected on the control of said main body.

21. An image forming apparatus main body configured to detachably mount at least two replacement parts, each replacement part including a storage medium storing information regarding the replacement part, the image forming apparatus main body including a single communication portion to communicate with the storage medium, wherein the communication portion has a communication range and is configured to be moveable relative to the storage media of the mounted at least two replacement parts so that the storage media are successively positioned within the communication range of the communication portion.

*22. A wireless communication system provided at an image forming apparatus, comprising a main body and a*

*plurality of periodic replacement parts insertably and removably mounted at the main body, the system comprising:*

*at least one main body antenna disposed at a communication portion of the main body; and*

*antennas attached to the periodic replacement parts,*

*wherein the antennas are supported by the periodic replacement parts such that coil axes of the antennas are substantially perpendicular to a direction of insertion and removal of the periodic replacement parts into and from the main body, and the main body antenna is supported by the main body such that a coil axis of the main body antenna is substantially parallel with at least one of the coil axes of the antennas.*

*23. A wireless communication system according to claim 22, wherein a plurality of the antennas are disposed facing the main body antenna.*

*24. A wireless communication system according to claim 23, further comprising an antenna selection section which selectively enables communication with any one of the plurality of the antennas.*

*25. An image forming apparatus, comprising:*

*a plurality of periodic replacement parts each including a storage medium, having an antenna, that stores information on the replacement part therein; and*

*a main body of said image forming apparatus to which said periodic replacement parts are detachably mounted, the main body including at least one communication portion,*

*wherein said main body reads the information stored in said storage medium through said communication portion and the antenna using radio waves, and*

*each antenna of the storage medium is attached to a circumferential surface of the respective periodic replacement parts.*

*26. An image forming apparatus according to claim 25, wherein the periodic replacement part is a developer cartridge.*

*27. An image forming apparatus according to claim 25, wherein the antenna faces the main body antenna when communication is carried out between the antenna and the main body antenna.*

*28. An image forming apparatus, comprising:*

*a plurality of periodic replacement parts each including a storage medium, having a coil shaped antenna, that stores information on the replacement part therein; and*

*a main body of said image forming apparatus to which said periodic replacement part is detachably mounted, the main body including at least one communication portion,*

*wherein said main body reads the information stored in said storage medium through said communication portion and the coil shaped antenna using radio waves, and*

*each coil shaped antenna of the storage medium is attached to the respective periodic replacement parts such that a coil axis of the coil shaped antenna is substantially perpendicular to a direction of insertion and removal of the periodic replacement part into and from the main body.*

*29. An image forming apparatus according to claim 28, wherein the periodic replacement part is a developer cartridge.*

*30. An image forming apparatus according to claim 28, wherein the antenna faces the main body antenna when communication is carried out between the antenna and the main body antenna.*

* * * * *